US011004115B2

(12) United States Patent
Hall et al.

(10) Patent No.: US 11,004,115 B2
(45) Date of Patent: May 11, 2021

(54) DETERMINING A USER'S SHOPPING INTERESTS BASED ON SENSOR DATA IDENTIFYING ATTRIBUTES OF THE USER'S GARMENT

(71) Applicant: INTERNATIONAL BUSINESS MACHINES CORPORATION, Armonk, NY (US)

(72) Inventors: Kevin W. Hall, Charlotte, NC (US); Stephen M. Leonard, Colorado Springs, CO (US); Rebecca E. Lutz, Orlando, FL (US); Todd D. Robinson, Frederick, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 521 days.

(21) Appl. No.: 14/945,494

(22) Filed: Nov. 19, 2015

(65) Prior Publication Data

US 2017/0148064 A1 May 25, 2017

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0261* (2013.01); *G06Q 30/0267* (2013.01)

(58) Field of Classification Search
None
See application file for complete search history.

(56) References Cited

U.S. PATENT DOCUMENTS

| 6,313,745 | B1* | 11/2001 | Suzuki | G06K 7/0008 |
| | | | | 340/568.1 |
| 2003/0236702 | A1* | 12/2003 | Hoblit | G06Q 30/0269 |
| | | | | 705/14.66 |
| 2005/0018216 | A1 | 1/2005 | Barsness et al. | |
| 2005/0108094 | A1* | 5/2005 | Hugron | G06Q 30/02 |
| | | | | 705/14.44 |
| 2008/0004951 | A1 | 1/2008 | Huang et al. | |

(Continued)

FOREIGN PATENT DOCUMENTS

WO WO-2015138865 A2 * 9/2015 ......... G06Q 30/0641

OTHER PUBLICATIONS

De Melo, Ernani Viriato. "Content-based Filtering Enhanced by Human Visual Attention Applied to Clothing Recommendation". 2015 IEEE 27th International Conference on Tools with Artificial Intelligence. Nov. 2015. (Year: 2015).*

(Continued)

*Primary Examiner* — Michael Bekerman
(74) *Attorney, Agent, or Firm* — Jay Wahlquist; Andrew D. Wright; Roberts Calderon Safran & Cole. P.C.

(57) ABSTRACT

A computer-implemented method includes: receiving, by a computing device, sensor data relating to the attributes of garment worn by a user; determining, by the computing device, the attributes of the garment based on receiving the sensor data; determining, by the computing device, the user's shopping interest based on determining the attributes of the garment; generating, by the computing device, a targeted advertisement based on the user's shopping interest; and outputting, by the computing device, the targeted advertisement for display at a merchant facility.

20 Claims, 8 Drawing Sheets

(56) References Cited

U.S. PATENT DOCUMENTS

| | | | | |
|---|---|---|---|---|
| 2010/0153187 A1* | 6/2010 | Ghani | ................... | G06Q 30/02 |
| | | | | 705/14.53 |
| 2011/0184831 A1 | 7/2011 | Dalgleish | | |
| 2013/0195322 A1 | 8/2013 | Santhiveeran et al. | | |
| 2013/0218677 A1 | 8/2013 | Yopp et al. | | |
| 2013/0290106 A1 | 10/2013 | Bradley et al. | | |
| 2014/0052567 A1 | 2/2014 | Bhardwaj et al. | | |
| 2014/0344102 A1 | 11/2014 | Cooper | | |
| 2015/0262230 A1* | 9/2015 | Cypher | ............. | G06Q 30/0251 |
| | | | | 705/14.49 |
| 2016/0026926 A1* | 1/2016 | Yeung | ................ | G06Q 30/0269 |
| | | | | 706/12 |
| 2016/0171534 A1* | 6/2016 | Linden | ............... | G06Q 30/0255 |
| | | | | 705/14.53 |
| 2020/0394699 A1* | 12/2020 | Mueller | ............. | G06Q 30/0185 |

OTHER PUBLICATIONS

Anonymous, "Method for Predicting and Targeting Advertising to Nearby Customers on Electronic Map", ip.com, Oct. 20, 2014; 3 Pages.

Mell et al., "The NIST Definition of Cloud Computing", NIST, Special Publication 800-145, Sep. 2011, 7 pages.

* cited by examiner

DETERMINING A USER'S SHOPPING INTERESTS BASED ON SENSOR DATA IDENTIFYING ATTRIBUTES OF THE USER'S GARMENT

BACKGROUND

The present invention generally relates to providing targeted ads to users, and more particularly, to determining user shopping interests in real-time using sensor and image data, and providing real-time targeted ads based on the determined user shopping interests.

Retailers are limited to advertising based on studies, focus groups, sales analysis, and other factors. These approaches are latent, after-the-fact, and removed from actual immediate consumer tendencies and experiences. Retailers miss an opportunity to correlate, link to, and predict from real-time customer preferences and attributes. For example, retailers in a mall setting often stage items and post advertising in storefronts based on considerations such as targeted consumer demographics, time of the year, and current fashion trends. However, when a potential customer walks past the storefront, the retailer's static presentation is not tailored to the potential customer and may not engage the attention of the potential customer. That is, the retailer's storefront presentation does not adapt based on the interests of nearby customers. Ultimately, retailers and consumers are not linked closely and not in an adaptive and customizable relationship. This represents a significant lost opportunity for both parties. As a result of static storefront presentations, opportunities are missed for enticing and encouraging potential customers to enter a retailer, thereby leading to missed opportunities for sales, improved customer/retailer relationships, brand improvement, etc.

SUMMARY

In an aspect of the invention, a computer-implemented method includes: receiving, by a computing device, sensor data relating to the attributes of garment worn by a user; determining, by the computing device, the attributes of the garment based on receiving the sensor data; determining, by the computing device, the user's shopping interest based on determining the attributes of the garment; generating, by the computing device, a targeted advertisement based on the user's shopping interest; and outputting, by the computing device, the targeted advertisement for display at a merchant facility. In further aspect, the sensor data is received from a wearable computing device as associated with the user as the user approaches the merchant facility. In a further aspect, the wearable computing device is embedded in the garment. In a further aspect, the method further includes further outputting the user's shopping interests to an admin device associated with shopping personnel of the merchant facility.

In another aspect of the invention, there is a computer program product comprising a computer readable storage medium having program instructions embodied therewith. The program instructions are executable by a computing device to cause the computing device to: receive sensor data relating to the attributes of garment worn by a user; determine the attributes of the garment based on receiving the sensor data; determine the user's shopping interest based on determining the attributes of the garment; and output the user's shopping interest to an admin device associated with shopping personnel of a merchant facility. In a further aspect, the program instructions further cause the computing device to: determine particular products of interest in a merchant's inventory based on the user's shopping interest; and output the products of interest to the admin device. In a further aspect, the program instructions further cause the computing device to: generate a targeted advertisement based on the user's shopping interest; and output the targeted advertisement for display at the merchant facility.

In another aspect of the invention, a system includes: a CPU, a computer readable memory and a computer readable storage medium associated with a computing device. The system includes: program instructions to receive sensor data relating to the attributes of garment worn by a user as the user approaches a merchant facility; program instructions to determine the attributes of the garment based on receiving the sensor data; program instructions to determine the user's shopping interest based on determining the attributes of the garment; program instructions to determine particular products of interest in a merchant's inventory based on the user's shopping interest; program instructions to generate a targeted advertisement based on the user's shopping interest and the particular products of interest; program instructions to output the targeted advertisement for display at a merchant facility; and program instructions to output the user's shopping interest and the particular products of interest to an admin device associated with shopping personnel of a merchant facility. The program instructions are stored on the computer readable storage medium for execution by the CPU via the computer readable memory. In a further aspect, the program instructions to determine the particular products of interest include program instructions to score products in a merchant's inventory based on the user's shopping interests.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
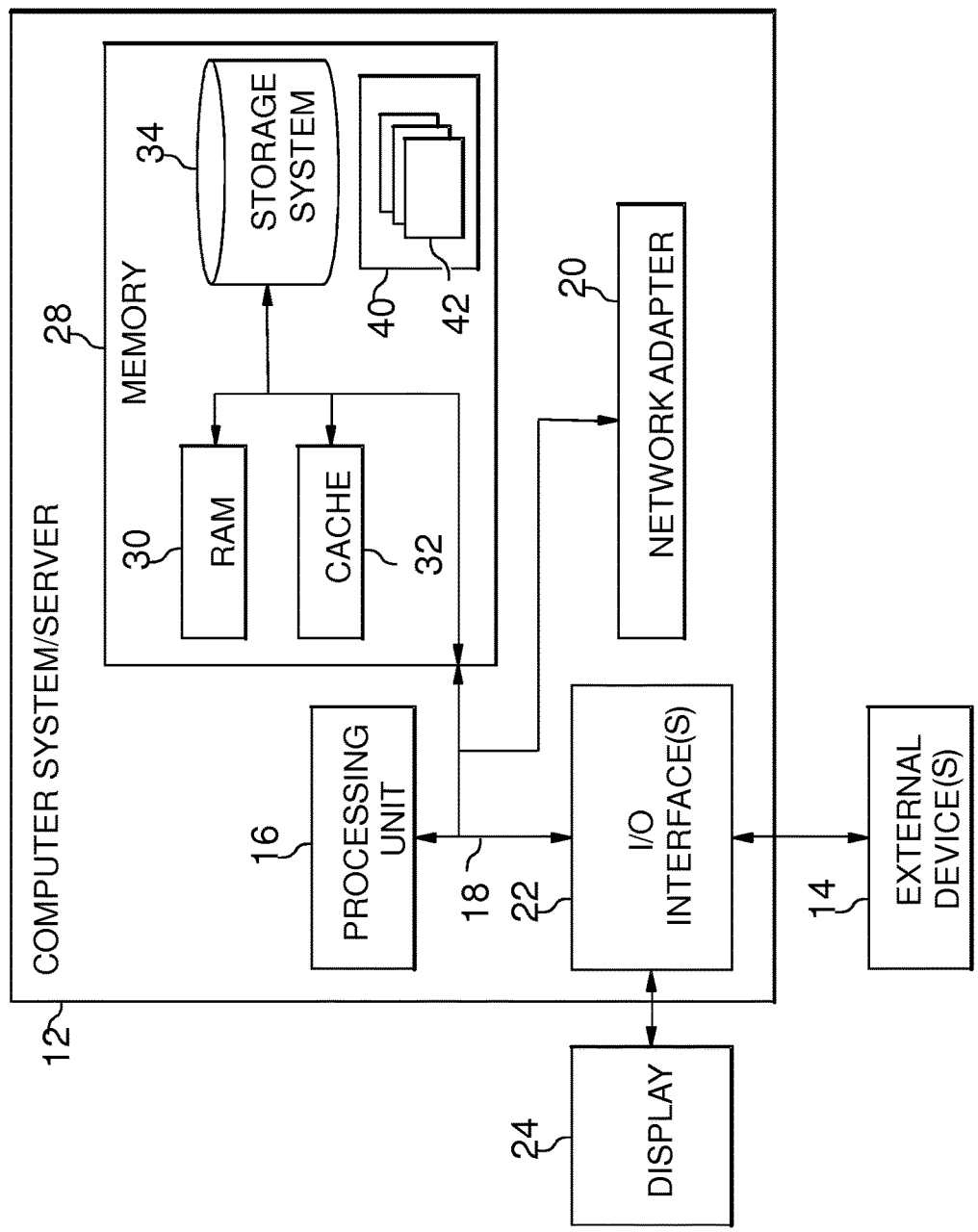
FIG. 1 depicts a cloud computing node according to an embodiment of the present invention.

The present invention generally relates to providing targeted ads to users, and more particularly, to determining user shopping interests in real-time using sensor and image data, and providing real-time targeted ads based on the determined user shopping interests. As described herein, aspects of the present invention may include a wearable computing device in the form of a garment tag with one or more embedded chips that store and transmit attributes regarding the garment (e.g., brand, color, size, type, materials, patterns, production date, text/images printed on the garment, etc.). Alternatively, the wearable computing device may store and transmit an identifier linked to the attributes. As a user approaches a merchant facility, sensors implemented at the merchant facility receive information identifying the attributes from the wearable computing device and determine the user's shopping interests based on the attributes of garments worn by the user. In alternative embodiments, cameras and/or other sensors may be implemented in the merchant facility to capture images of the user's garments. Image processing techniques may then be used to determine attributes of the user's garments, and the user's shopping interests may be determined based on the attributes of the user's garments.

In accordance with aspects of the present invention, a targeted ad is determined based on the user's shopping interests. The targeted ad is presented to the user (e.g., on an electronic display at a storefront of a merchant facility as the user approaches the merchant facility). In this way, the likelihood that the user may enter the merchant facility is increased, as the user is presented with a targeted ad that is determined based on the user's shopping interests. The targeted ad is more likely to entice the user's interest than a static ad that does not change. Advantageously, sales and customer experience are improved.

Accordingly, aspects of the present invention obtain information regarding a user's shopping interests (e.g., based on the attributes of garments being worn by the user) using sensor and/or image processing technology. In embodiments, the user's shopping interests are determined in near real-time (e.g., as the user is approaching a merchant facility).

In accordance with aspects of the present invention, ads presented on the electronic display may change and adapt based on the shopping interests of passing users. For example, the electronic display may present computer video, audio, or image files that are selected based on the user's shopping interest. In alternative embodiments, if multiple users are within communications range of sensors and cameras used to determine garment attributes, then multiple ads may be displayed via the electronic display. Alternatively, ads that may appeal to a majority of the users may be displayed, or ads that may appeal to the users of wearing particular brands of garment may be displayed.

As described herein, wearable computing devices in the form of garment tags may include embedded computing chips having radio communications hardware (e.g., short range radio communications hardware). While users may be aware of such garment tags as when presented with targeted ads custom tailored to their interests, the embedded computing chips in the garment tags are substantially small and lightweight so as to not be felt by the wearer of the garment. As described herein, the garment tags may store and transmit (e.g., using radio and computing hardware) information about the garment, such as key attributes, unique identifiers, etc.

In alternative embodiments, image processing techniques may be used to determine the attributes of garments worn by users (e.g., to supplement information received in tags, or when users are wearing garments that do not include a garment tag with the embedded computing chips). In embodiments, video cameras/sensors and associated software may be used to visually measure and identify attributes of garments worn by users approaching a merchant facility (e.g., color, pattern, proportions etc.).

In accordance with aspects of the present invention, data regarding the attributes of garments are processed by an analytics and processing server to determine the user's shopping interests (e.g., the attributes of products the user may be interested in purchasing). Further, the user's shopping interests may be used to determine specific products of interests in a merchant's inventory (e.g., specific products that match the user's interests). A targeted ad may present merchandise that match shopping interests of the user based on the garments the user is wearing. In embodiments, the targeted ad may also include coupons or other promotions generated in real-time based on the user's shopping interests. As an illustrative example, a targeted ad may present garments (e.g., clothing, accessories, etc.) of a similar brand, color, style, or price as the garment being worn by the user.

In alternative embodiments, the products of interest may or may not include clothing or garment products. That is, the attributes of garments being worn by the user may indicate the user's shopping interests for other types of products. As an illustrative example, if a user is wearing a garment with an image of a particular musician or a musician's logo, a determination is made that the user may be interested in the particular musician. For a merchant that sells records and related merchandise, products of interests may include products that relate to the particular musician (e.g., albums, memorabilia, or other merchandise featuring the musician).

In embodiments, information identifying a user's shopping interests and/or products of interests may be provided to sales personnel to help direct and expedite a user's shopping experience. Advantageously, customer shopping experience and relationship with a retailer or merchant who more closely aligns with the user's interest is significantly positively impacted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units (CPUs) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
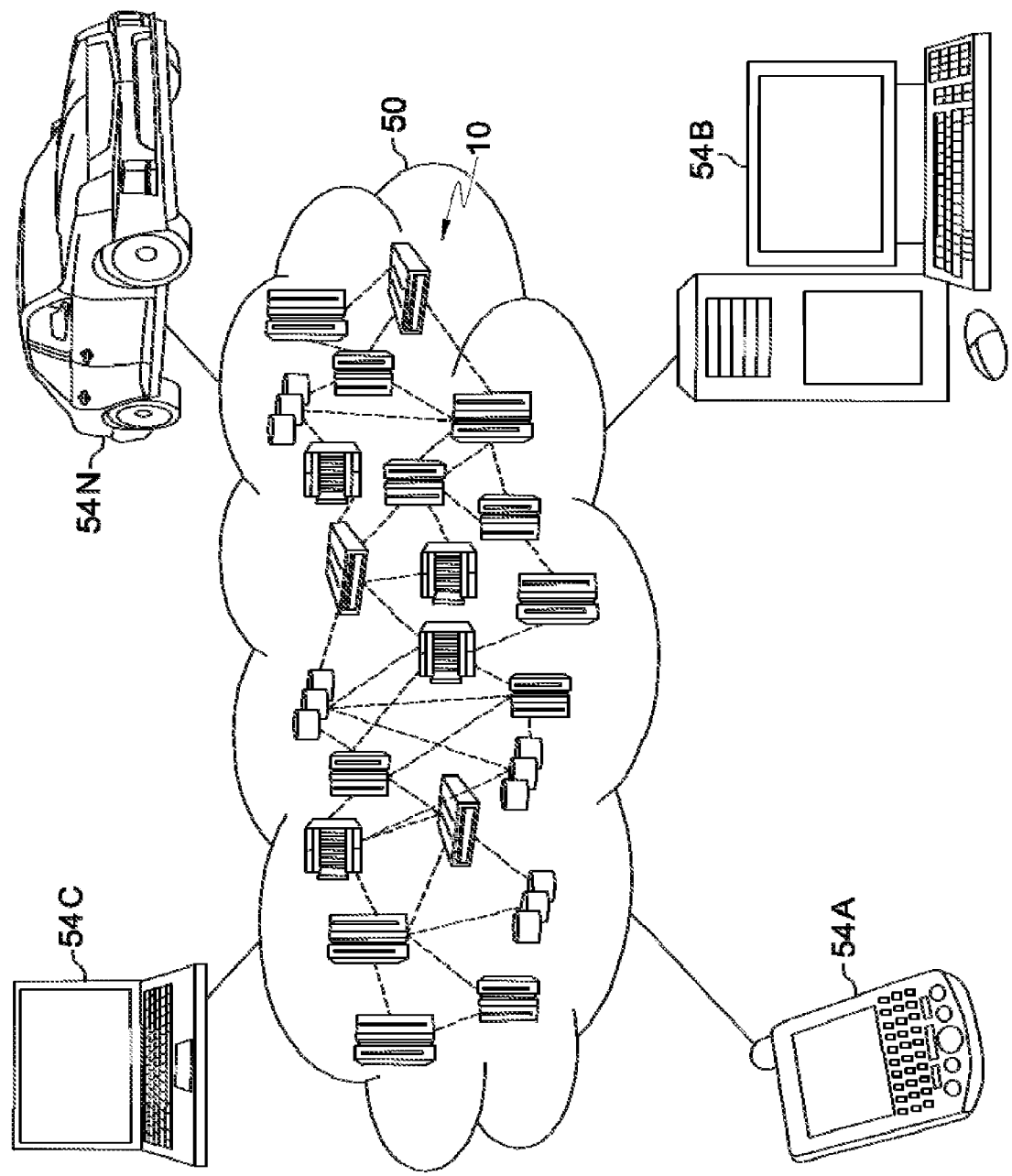
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
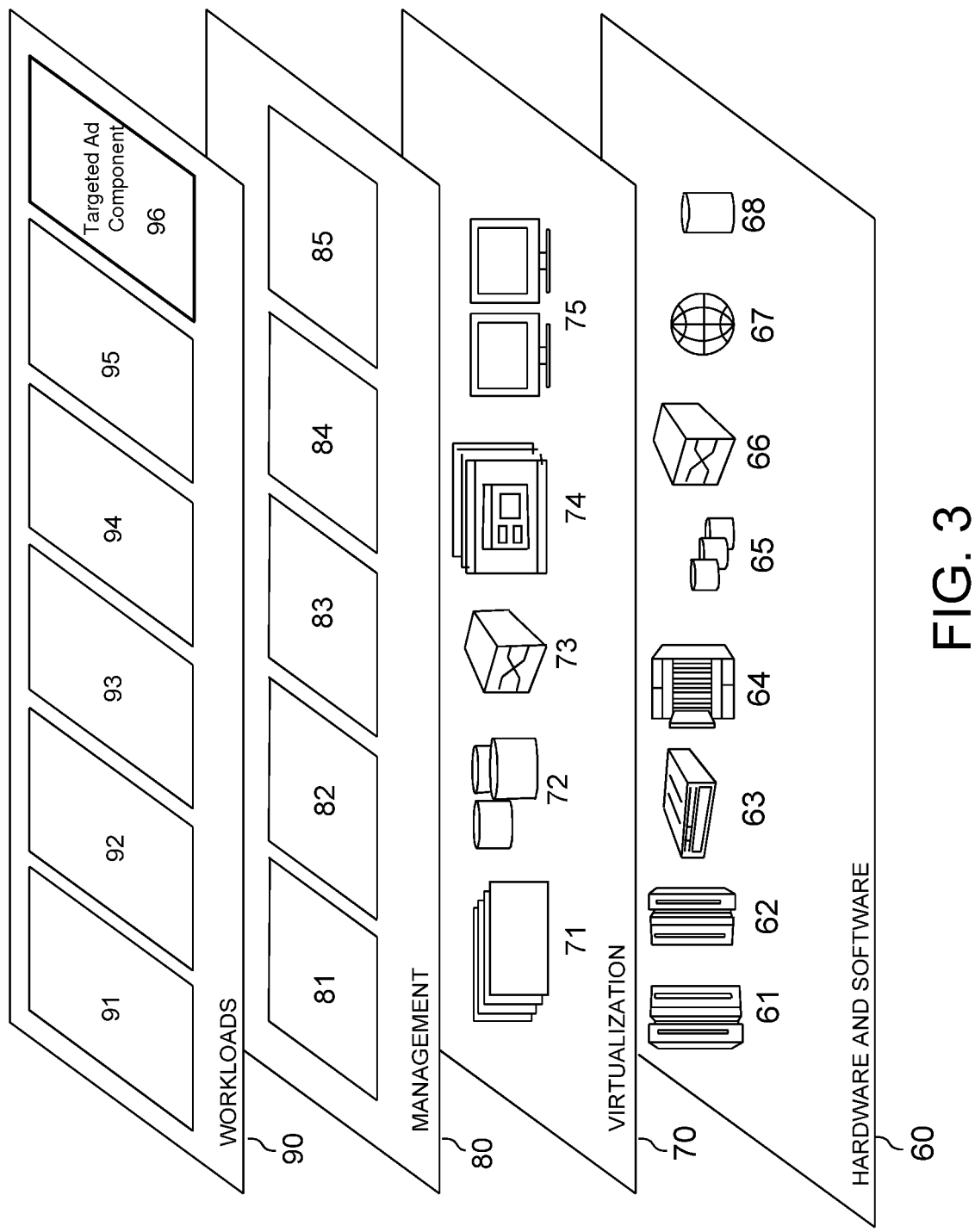
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a targeted ad component 96.

Referring back to FIG. 1, the Program/utility 40 may include one or more program modules 42 that generally carry out the functions and/or methodologies of embodiments of the invention as described herein. Specifically, the program modules 42 may receive sensor data, extract user shopping interests from the sensor data, determine products of interest by correlating user shopping interests to merchant inventory, generate a targeted ad identifying products of interest, output the targeted ad for display, and output user shopping interests and/or products of interest to an admin device. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a targeted ad component 96 in FIG. 4.

Figure 4:
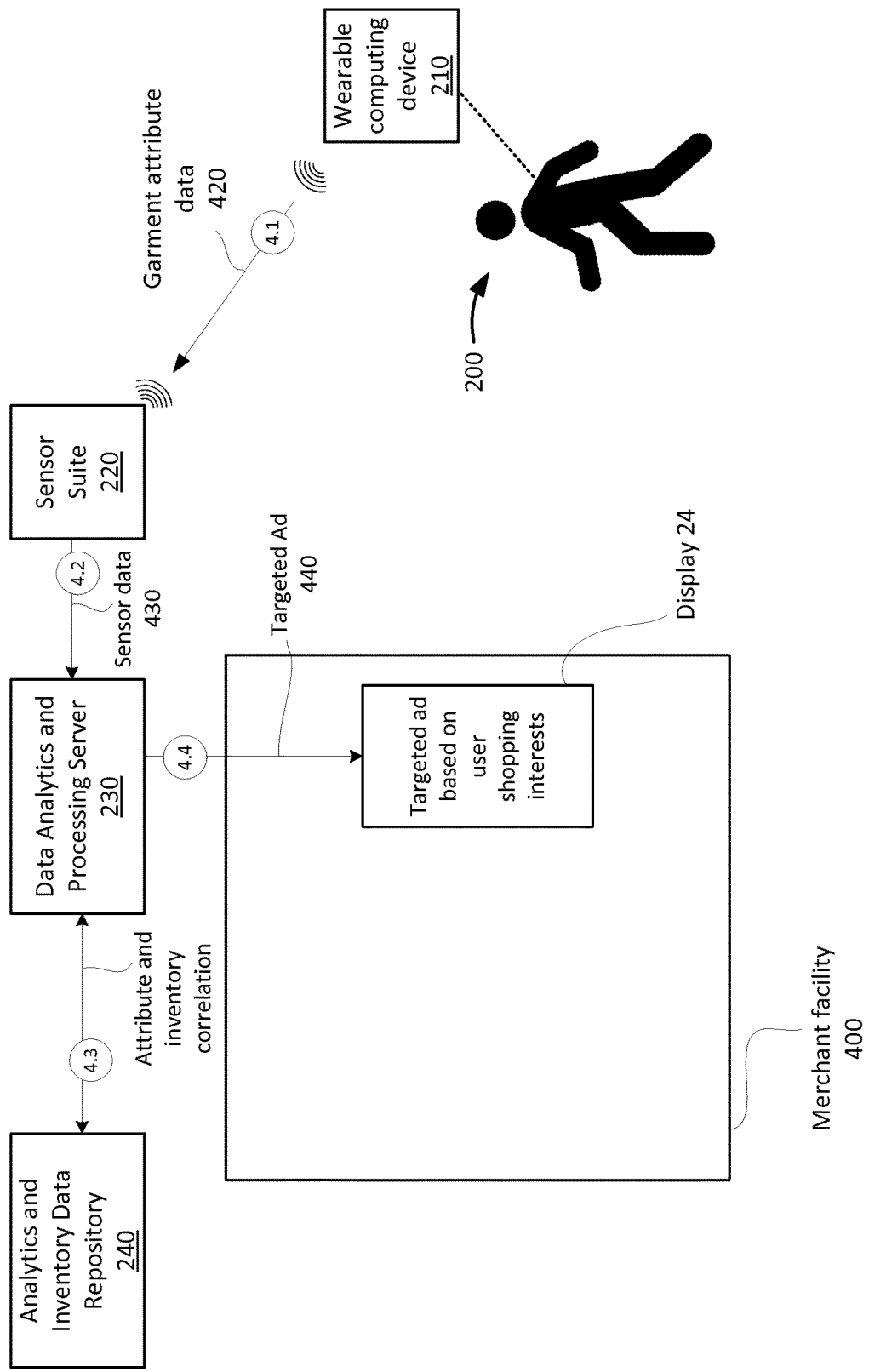
FIG. 4 shows an overview of an example implementation in accordance with aspects of the present invention.

FIG. 4 shows an overview of an example implementation as described herein. As a user 200 approaches a merchant facility 400, a wearable computing device 210 (e.g., in the form of a garment tag attached to the user's garment) transmits garment attribute data 420 to a sensor suite 220 (at step 4.1). In embodiments, the user 200 may be wearing multiple garments with respective wearable computing devices 210 that each output garment attribute data 420. In embodiments, the sensor suite 220 receives the garment attribute data 420 which identifies the attributes of the garment or includes an identifier which may later be used to identify the attributes of the garment. Further, the sensor suite 220 may capture images of the user to determine the attributes of the garment being worn by the user. The sensor suite 220 may output sensor data 430 (at step 4.2) to a data analytics and processing server 230. The sensor data 430 may include the garment attribute data 420 and/or image data.

Based on receiving the sensor data 430, the data analytics and processing server 230 may process the sensor data 430 to determine the attributes of the garments. For example, for image data included in the sensor data 430, the data analytics and processing server 230 may use image classification and/or image processing techniques to determine the attributes of the garment. If the sensor data 430 includes an identifier of the garment, the data analytics and processing server 230 may communicate with an external server (e.g., an analytics and inventory data repository 240) to determine the attributes of the garment based on the identifier. In embodiments, the data analytics and processing server 230 may determine the attributes of multiple garments worn by the user based on multiple communications received from different wearable computing devices 210. In alternative embodiments, the data analytics and processing server 230 may determine the attributes of some garments using the garment attribute data 420 received from the wearable computing device 210, while determining the attributes of other garments using image data.

At step 4.3, the data analytics and processing server 230 may communicate with the analytics and inventory data repository 240 to correlate the attributes of the garment with inventory of the merchant facility 400. For example, the analytics and inventory data repository 240 may store information identifying the inventory of the merchant facility 400 and the attributes associated with the inventory (e.g., the types, brands, sizes, colors, patterns, styles, text/images, etc. of the merchandise sold by the merchant). The data analytics and processing server 230 may match the attributes of the user's garments with the attributes of the inventory. The data analytics and processing server 230 may select a targeted add 440 based on the merchandise in the inventory having similar attributes as the attributes of the user's garments. For example, the data analytics and processing server 230 may select a targeted ad 440 that advertises merchandise having similar brands, price ranges, colors, styles, etc. as the user's garments. In embodiments, the targeted ad 440 may be a computer image file, video file, audio file, and/or text that advertises particular merchandise. Further, the targeted ad 440 may include promotions for advertised merchandise.

In embodiments, the data analytics and processing server 230 may implement a scoring or weighting algorithm to select a particular ad or particular merchandise for advertising. For example, merchandise having a greater number of attributes as the user's garment are scored higher than merchandise having a fewer number of attributes as the user's garment. In embodiments, particular attributes may be weighed higher than others. For example, merchandise of the same brand may be weighed higher than merchandise of the same color. Also, the types of advertisements may be selected based on certain attributes. For example, if a user is wearing a garment of a particular brand (e.g., a budget brand), the data analytics and processing server 230 may anticipate or predict that the user is more likely to respond to advertisements of other budget brands or advertisements with promotions. As another example, if a user is wearing a garment of a luxury brand, the data analytics and processing server 230 may anticipate or predict that the user is more likely to respond to advertisements of other luxury brands. In embodiments, the data analytics and processing server 230 may implement any type of scoring algorithm to select a particular ad or particular merchandise for advertising based on the attributes of the garments worn by the user.

At step 4.4, the data analytics and processing server 230 may output a selected targeted ad 440 to a display 24 presented at the merchant facility 400. The display 24 may display the targeted ad such that the user 200 views the targeted ad as the user 200 approaches the merchant facility 400. In this way, the user's interest is potentially higher than if a static ad was displayed since the targeted ad is custom tailored to the user's shopping interest based on the attributes of the user's garments. As described herein, the user's shopping interest may relate to the types of products that the user may be interested in purchasing. In embodiments, the display 24 may be a holographic display and/or any other type of conventional electronic display. In embodiments, the display may be in front of the merchant facility 400 (as shown in FIG. 4) or at another location (e.g., inside the merchant facility, or at any other desired location). As described herein, merchant representatives (e.g., sales representatives) may receive information regarding the user's shopping interests when the user 200 enters the merchant facility 400 (e.g., in order to better serve the user 200).

In embodiments, another targeted ad is displayed when other users approach the merchant facility 400. For example, as one user walks past and away from the merchant facility 400, and as another user approaches the merchant facility 400, the ad 440 is changed based on the garment attributes of the user approaching the merchant facility 400. In embodiments, the sensor suite 220 may determine when a user is walking past and away from the merchant facility 400 versus towards the merchant facility 400 based on the signal strength of the communication between the wearable computing device 210 and the sensor suite 220. Additionally, or alternatively, the sensor suite 220 may use image processing techniques to determine whether a user is walking away from the merchant facility 400 or towards the merchant facility 400.

As described above, when multiple users are within communications range of the sensor suite 220 used to determine garment attributes, then multiple ads may be selected and displayed via the display 400. Alternatively, ads that may appeal to a majority of the users may be displayed, or ads that may appeal to the users of wearing particular brands of garment may be displayed.

Figure 5:
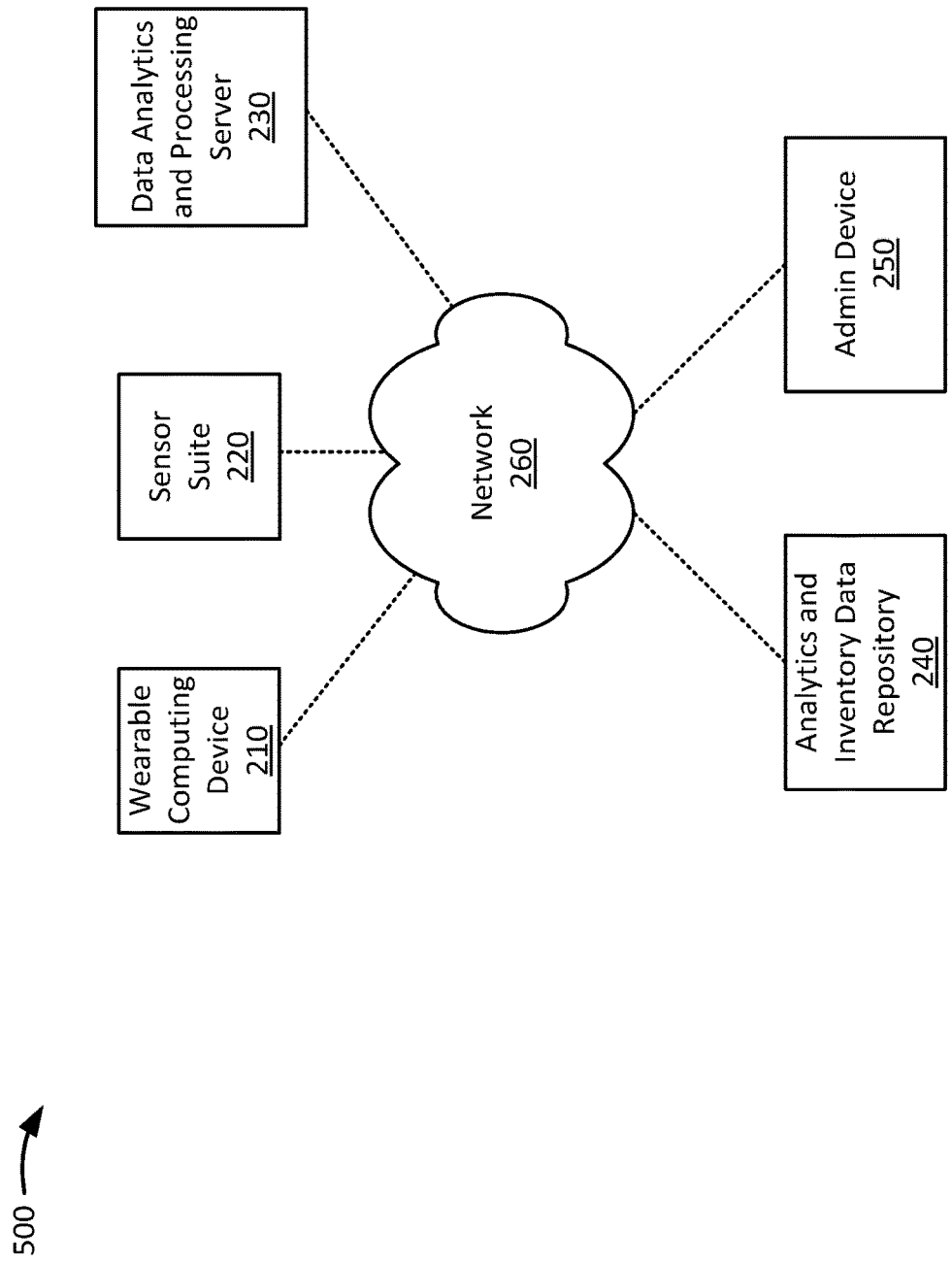
FIG. 5 shows an example environment in accordance with aspects of the present invention.

FIG. 5 shows an example environment in accordance with aspects of the present invention. As shown in FIG. 5, environment 500 may include a wearable computing device 210, a sensor suite 220, a data analytics and processing server 230, an analytics and inventory data repository 240, an admin device 250, and a network 260. In embodiments, one or more components in environment 500 may correspond to one or more components in the cloud computing environment of FIG. 2. One or more components in environment 500 may further correspond to one or more components in the computer system/server 12 of FIG. 1.

The wearable computing device 210 may include a computing device that is integrated and embedded into a garment (e.g., into a garment tag). In embodiments, the wearable computing device 210 may include short-range, low frequency radio chips that store and/or transmit data regarding the garment in which the wearable computing device 210 is embedded.

The sensor suite 220 may include one or more radios and/or cameras to receive data transmitted by the wearable computing device 210. Also, the sensor suite 220 may capture images which may be processed to determine attributes of garment being worn by a user. In embodiments, the sensor suite 220 may be implemented on a storefront of a merchant facility such that data is received from the wearable computing device 210 as users approach the storefront.

The data analytics and processing server 230 may include one or more computing devices that includes one or more components of the computer system/server 12 of FIG. 1, and may further include the program modules 42. In embodiments, the data analytics and processing server 230 may receive sensor data from the wearable computing device 210 (e.g., data from the wearable computing device 210 and/or image data). The data analytics and processing server 230 may process the sensor data to determine the attributes of garments being worn by a user, determine user shopping interests based on the attributes, determine inventory that matches the user shopping interests, and generate a target ad based on the user shopping interest and/or the determined inventory. The data analytics and processing server 230 may include an associated display 24 via which the targeted ads are presented.

The analytics and inventory data repository 240 may include one or more computing devices that store information regarding garment attributes based on an identifier of the garment. In embodiments, the analytics and inventory data repository 240 may further store attributes of merchandise in a merchant's inventory (which the data analytics and processing server 230 may use to match the inventory with a user's shopping interests).

The admin device 250 may include a computing device or a user device (e.g., a tablet, smartphone, laptop, etc.) that receives information regarding a user's shopping interests from the data analytics and processing server 230, and displays the information regarding a user's shopping interests. Sales personnel may use the displayed information to better serve or assist a user when the user enters the merchant's facility.

The network 260 may include network nodes, such as network nodes 10 of FIG. 2. Additionally, or alternatively, the network 260 may include one or more wired and/or wireless networks. For example, the network 260 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 260 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
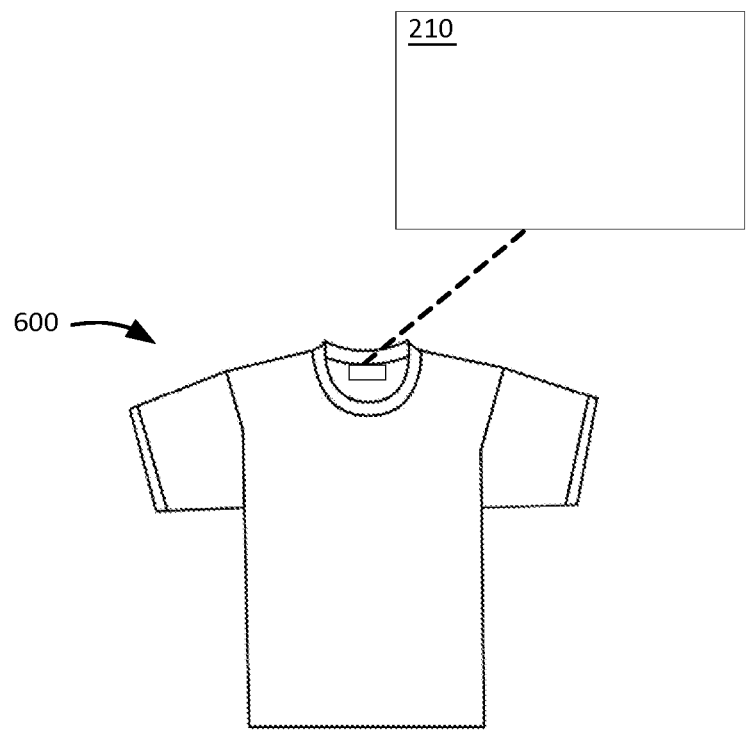
FIG. 6 shows example details of a wearable computing device in accordance with aspects of the present invention.

FIG. 6 shows example details of a wearable computing device in accordance with aspects of the present invention. As shown in FIG. 6, garment 600 may include a wearable computing device 210 that is embedded in a garment tag attached to the garment 600. In embodiments, the wearable computing device 210 may include a radio frequency ID (RFID) device and/or other devices. The wearable computing device 210 may transmit the RFID (and/or other information) associated with the attributes of the garment 600.

Figure 7:
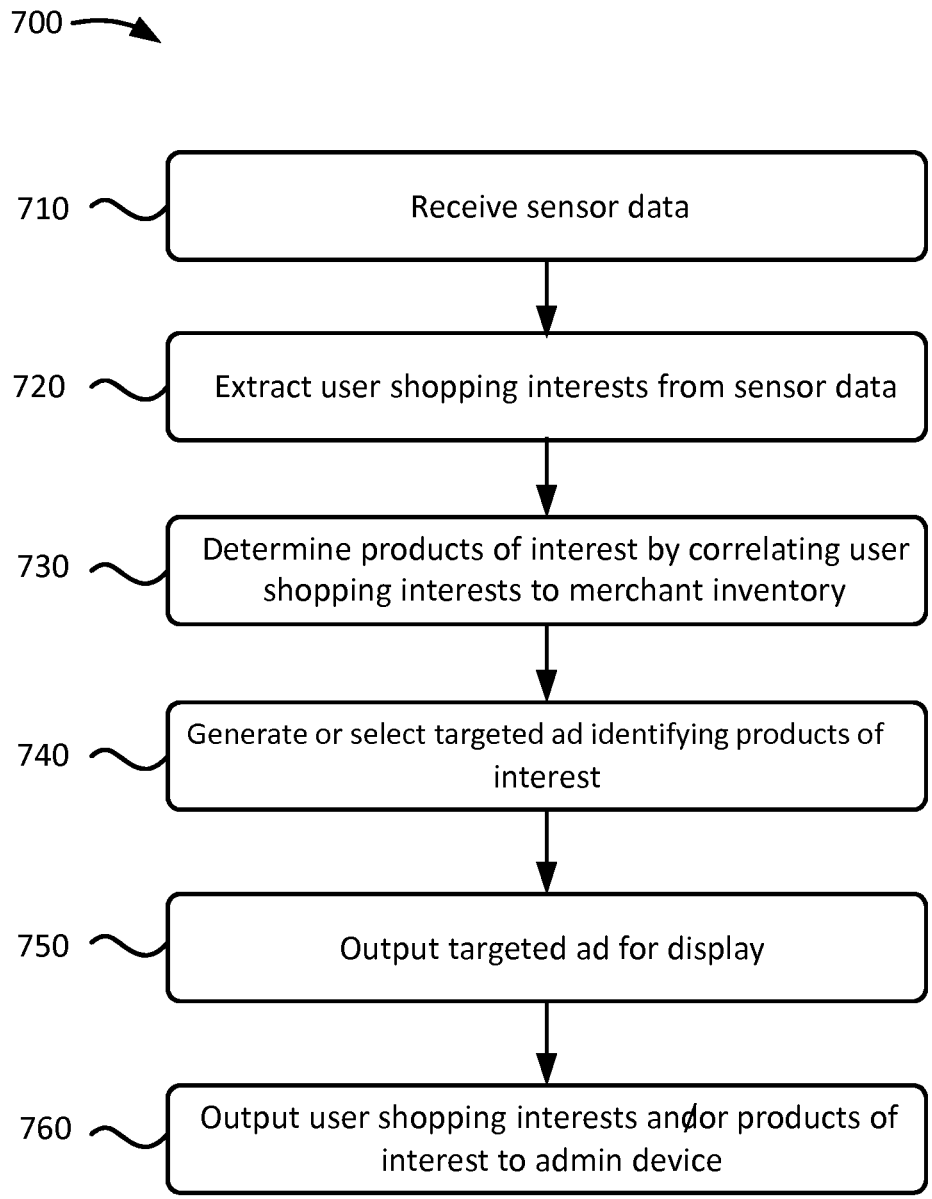
FIG. 7 shows an example flowchart for generating a target ad for display in real-time based on a user's shopping interest in accordance with aspects of the present invention.

FIG. 7 shows an example flowchart for generating a target ad for display in real-time based on a user's shopping interest in accordance with aspects of the present invention. The steps of FIG. 7 may be implemented in the environments of FIGS. 4 and 5, for example, and are described using reference numbers of elements depicted in FIGS. 4 and 5. As noted above, the flowchart illustrates the architecture, functionality, and operation of possible implementations of systems, methods, and computer program products according to various embodiments of the present invention.

As shown in FIG. 7, process 700 may include receiving sensor data (step 710). For example, the data analytics and processing server 230 may receive the sensor data for a user approaching a merchant facility. The data analytics and processing server 230 may receive the sensor data from the sensor suite 220 (e.g., attributes of a garment from the wearable computing device 210 and/or image data captured by the sensor suite 220).

Process 700 may also include extracting the user's shopping interests from the sensor data (step 720). For example, the data analytics and processing server 230 may extract the user's shopping interests (e.g., information regarding the types of products the user may be interested in purchasing) by determining the attributes of the garment based on the sensor data. In embodiments, the attributes are provided to the data analytics and processing server 230 when the wearable computing device 210 stores and transmits the attributes as part of the sensor data. In alternative embodiments, the data analytics and processing server 230 communicates with the analytics and inventory data repository 240 to obtain the attributes associated with an identifier of the garment (e.g., when the wearable computing device 210 transmits only an identifier of the garment). In alternative embodiments, the data analytics and processing server 230 may process image data received from the sensor suite 220 to determine the attributes of the garment. For example, the data analytics and processing server 230 may use image classification and/or image processing techniques to identify the style, size, color, patterns, and/or other attributes of the garment.

Process 700 may further include determining products of interests by correlating the user's shopping interests to the merchant's inventory (step 730). For example, the data analytics and processing server 230 may communicate with the analytics and inventory data repository 240 to match the attributes of the garment (e.g., relating to the user's shopping interests) to the attributes of merchandise being sold by the merchant. In embodiments, the products of interest may or may not include clothing or garment products. That is, the attributes of garments being worn by the user may indicate the user's shopping interests for other types of products. As an illustrative example, if a user is wearing a garment with an image of a particular musician or a musician's logo, the data analytics and processing server 230 determines that the user is interested in the particular musician. For a merchant that sells records and related merchandise, the data analytics and processing server 230 may determine products of interests that relate to the particular musician (e.g., albums, memorabilia, or other merchandise featuring the musician).

As described herein, the data analytics and processing server 230 may determine products of interest by scoring the products based on their attributes and the attributes of the user's garment. As previously described, particular attributes may be weighted more heavily than other attributes when scoring the products. As described herein, the user's shopping interests relate to the types of products the user may be interested in purchasing, whereas the products of interest may relate to specific products offered by a merchant that the user may be interested in purchasing.

Process 700 may also include generating or selecting a targeted ad identifying the products of interest (step 740). For example, the data analytics and processing server 230 may generate or select a targeted ad identifying the products of interest. In embodiments, the data analytics and processing server 230 may select images/videos featuring the products of interests. Additionally, or alternatively, the data analytics and processing server 230 may generate a video/image that includes the products of interests. Further, the data analytics and processing server 230 may generate a targeted ad with promotions. In this way, the targeted ad is custom tailored to the user's shopping interest, thereby increasing the chances of encouraging the user to visit the merchant's facility.

Process 700 may further include outputting the targeted ad for display (step 750). For example, the data analytics and processing server 230 may output the targeted ad for display to the display 24. The display 24 may display the targeted ad such that the targeted ad is viewable to the user as the user approaches the storefront, thereby increasing the chances of encouraging the user to visit the merchant's facility.

Process 700 may also include outputting the user's shopping interests and/or products of interest to an admin device (step 760). For example, the data analytics and processing server 230 may output information regarding the user's shopping interests and/or products of interest to the admin device 250 for display on the admin device 250. Sales personnel associated with the admin device 250 may use the information regarding the user's shopping interests and/or products of interest to better serve the user, thereby improving the user's shopping experience and relationship with the merchant. In embodiments, the data analytics and processing server 230 may output the information regarding the user's shopping interests and/or products of interest to the admin device 250 when the user as entered the merchant facility. For example, as described in greater detail with respect to FIG. 8, the data analytics and processing server 230 may receive an indication that the user has entered the merchant facility based on sensor data captured by the sensor suite 220.

Figure 8:
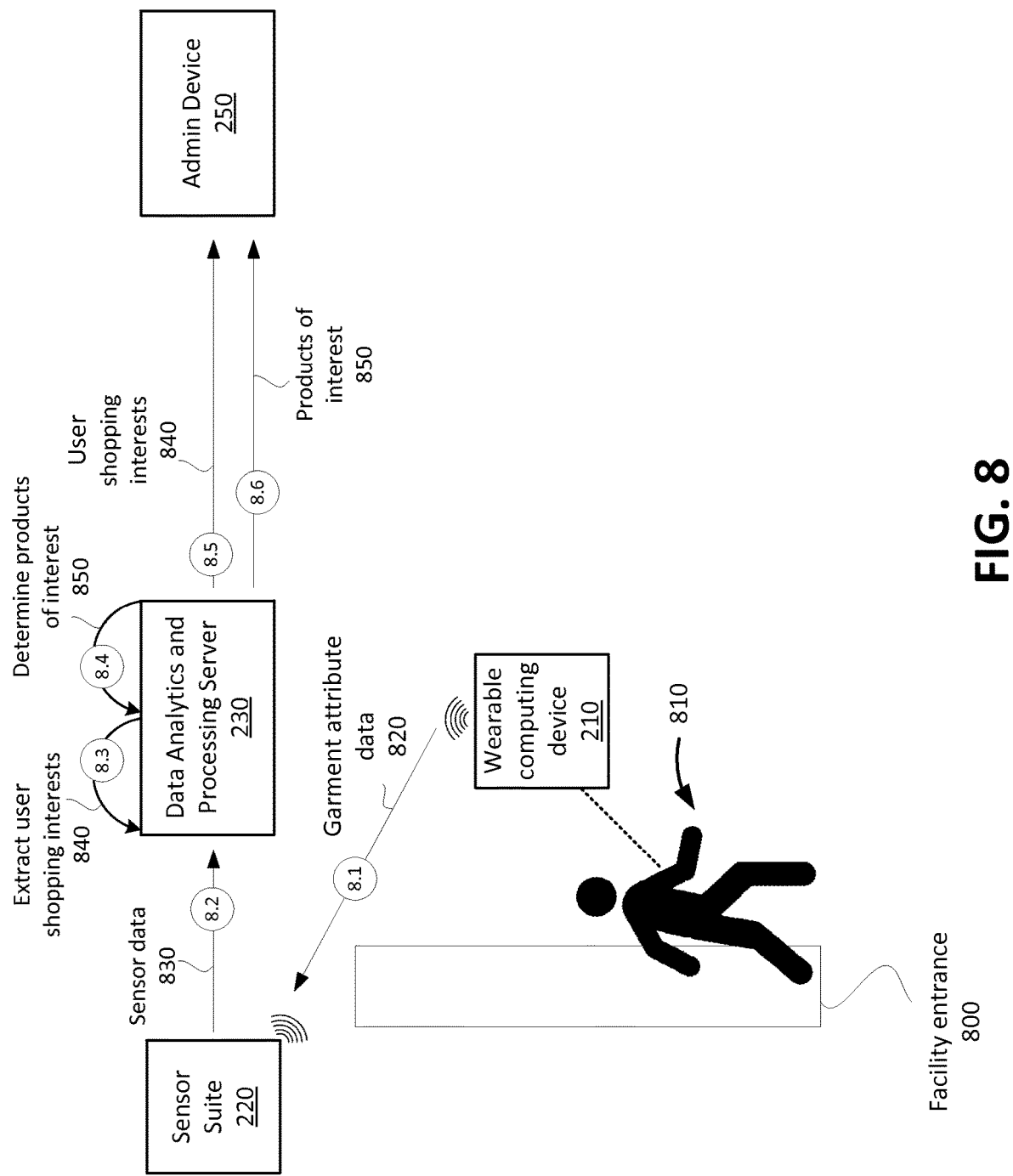
FIG. 8 shows a diagram of example processes for providing information regarding a user's shopping interests and products of interest to in accordance with aspects of the present invention.

FIG. 8 shows a diagram of example processes for providing information regarding a user's shopping interests and products of interest to in accordance with aspects of the present invention. As shown in FIG. 8, a wearable computing device 210, associated with a user 810, may output garment attribute data 820 to the sensor suite 220 (at step 8.1). For example, the wearable computing device 210 may output the garment attribute data 820 when the user 810 enters a facility entrance 800 of a merchant facility. In embodiments, the sensor suite 220 may include a set of motion sensors that cause a radio or related hardware to receive the garment attribute data 820 when the motion sensors detect that the user 810 enters the facility. In embodiments, the sensor suite 220 may additionally or alternatively capture image data when the user 810 enters the facility.

At step 8.2, the sensor suite 220 outputs, to the data analytics and processing server 230, sensor data 830 including the garment attribute data and/or the image data. At steps 8.3 and 8.4, the data analytics and processing server 230 extracts user shopping interest 840 and determines products of interest 850 as described above with respect to process 700 of FIG. 7. At step 8.5 and 8.6, the data analytics and processing server 230 outputs the user's shopping interests 840 and the products of interest 850 to the admin device 250. As a result, sales personnel are better prepared to assist the user 810 by readily having information regarding the user's interests and products of interest.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device and from a sensor suite, sensor data relating to attributes of a garment worn by a user, the sensor data including image data of images of the user;
   determining, by the computing device, the attributes of the garment based on processing the sensor data with the computing device;
   determining, by the computing device, the user's shopping interest based on determining the attributes of the garment, the determining being based on a signal strength of a communication between a wearable computer device associated with the user and the sensor suite, indicating whether the user is approaching a merchant facility or moving away from the merchant facility;

generating, by the computing device, a targeted advertisement based on the user's shopping interest, wherein the generating the targeted advertisement includes selecting particular merchandise to advertise based on a scoring technique that scores the particular merchandise using weights that weigh the attributes differently, wherein the weights relate to a measure of similarity between the attributes of the garment worn by the user and attributes of the particular merchandise; and outputting, by the computing device, the targeted advertisement for display on to a digital exterior sign at the merchant facility and viewable by the user as the user approaches the merchant facility, wherein the determining the attributes of the garment includes determining the attributes of the garment using image classification or image processing techniques based on the image data.

2. The method of claim 1, wherein the sensor data is received from the wearable computer device associated with the user as the user approaches the merchant facility.

3. The method of claim 2, wherein the wearable computer device is embedded in the garment.

4. The method of claim 1, wherein:
the sensor data includes an identifier of the garment, and
the determining the attributes of the garment includes accessing an external database that stores the attributes of the garment based on the identifier.

5. The method of claim 1, wherein the attributes of the garment include at least one of:
brand;
color or patterns;
size;
type;
materials;
patterns;
production date; and
text or images printed on the garment.

6. The method of claim 1, further comprising determining a product of interest based on the user's shopping interest, wherein the targeted advertisement identifies the product of interest.

7. The method of claim 6, wherein the determining the product of interest includes identifying products in a merchant's inventory having attributes that match the user's shopping interest.

8. The method of claim 6, wherein the determining the product of interest includes scoring products in a merchant's inventory based on the user's shopping interest.

9. The method of claim 1, wherein the targeted advertisement further includes promotions based on the user's shopping interest.

10. The method of claim 1, further comprising outputting the user's shopping interest to an admin device associated with shopping personnel of the merchant facility.

11. The method of claim 1, wherein a service provider at least one of creates, maintains, deploys and supports the computing device.

12. The method of claim 1, wherein steps of claim 1 are provided by a service provider on a subscription, advertising, and/or fee basis.

13. The method of claim 1, wherein the computing device includes software provided as a service in a cloud environment.

14. The method of claim 1, wherein the determining the user's shopping interest is further based on information in a social media profile of the user.

15. The method of claim 1, wherein the scoring technique weighs merchandise having a greater number of attributes in common as the garment worn by the user higher than merchandise having a fewer number of attributes in common as the garment worn by the user.

16. A computer program product comprising a computer readable storage medium having program instructions embodied therewith, the program instructions executable by a computing device to cause the computing device to:

receive, from a sensor suite, sensor data relating to attributes of garment worn by a user, the sensor data including image data of images of the user;

determine the attributes of the garment based on processing the sensor data with the computing device;

select particular merchandise based on a scoring technique that scores the particular merchandise using weights that weigh the attributes differently, wherein the weights relate to a measure of similarity between the attributes of the garment worn by the user and attributes of the particular merchandise;

determine the user's shopping interest based on the determining the attributes of the garment, the determining being based on a signal strength of a communication between a wearable computer device associated with the user and the sensor suite, indicating whether the user is approaching a merchant facility or moving away from the merchant facility; and output information regarding the user's shopping interest and the particular merchandise to an admin device associated with shopping personnel of the merchant facility, wherein, the determining the attributes of the garment includes determining the attributes of the garment using image classification or image processing techniques based on the image data.

17. The computer program product of claim 16, wherein the program instructions further cause the computing device to:

determine a product of interest in a merchant's inventory based on the user's shopping interest; and output information regarding the product of interest to the admin device.

18. The computer program product of claim 16, wherein the program instructions further cause the computing device to:

generate a targeted advertisement based on the user's shopping interest; and output the targeted advertisement for display at the merchant facility.

19. A system comprising:
a CPU, a computer readable memory and a computer readable storage medium associated with a computing device;

program instructions to receive, from a sensor suite, sensor data relating to attributes of garment worn by a user as the user approaches a merchant facility, the sensor data including image data of images of the user;

program instructions to determine the attributes of the garment based on processing the sensor data with the CPU;

program instructions to determine the user's shopping interest based on the determining the attributes of the garment, the determining being based on a signal strength of a communication between a wearable computer device associated with the user and the sensor suite, indicating whether the user is approaching a merchant facility or moving away from the merchant facility;

program instructions to determine a product of interest in a merchant's inventory based on the user's shopping interest;

program instructions to generate a targeted advertisement based on the user's shopping interest and the product of interest, wherein the generating the targeted advertisement is based on a scoring technique that scores the product of interest using weights that weigh the attributes differently, wherein the weights relate to a measure of similarity between the attributes of the garment worn by the user and attributes of the product of interest;

program instructions to output the targeted advertisement for display on to a digital exterior sign at the merchant facility and viewable by the user as the user approaches the merchant facility; and program instructions to output the user's shopping interest and the particular products of interest to an admin device associated with shopping personnel of the merchant facility, wherein the program instructions are stored on the computer readable storage medium for execution by the CPU via the computer readable memory, wherein the determining the attributes of the garment includes determining the attributes of the garment using image classification or image processing techniques based on the image data.

20. The system of claim 19, wherein the determining the particular products of interest includes scoring products in a merchant's inventory based on the user's shopping interest.

* * * * *